DIGITAL ADDER WITH EXPEDITED INTRASTAGE CARRY

Filed Dec. 27, 1966 2 Sheets-Sheet 1

INVENTOR
RICHARD G. SOGGE
BY
Blair Buckles & Cesari
ATTORNEYS

Nov. 25, 1969 R. G. SOGGE 3,480,768

DIGITAL ADDER WITH EXPEDITED INTRASTAGE CARRY

Filed Dec. 27, 1966

2 Sheets-Sheet 2

INVENTOR.
RICHARD G. SOGGE

BY

Blair Buckles & Cesari
ATTORNEYS

United States Patent Office 3,480,768
Patented Nov. 25, 1969

3,480,768

DIGITAL ADDER WITH EXPEDITED INTRASTAGE CARRY

Richard G. Sogge, Hudson, Mass., assignor to Digital Equipment Corporation, Maynard, Mass.

Filed Dec. 27, 1966, Ser. No. 604,765
Int. Cl. G06f 5/02, 7/385
U.S. Cl. 235—175 17 Claims

ABSTRACT OF THE DISCLOSURE

A binary parallel adder stage attains high speed intrastage carry operation with a carry circuit having a switch that combines the carry-in signal with a three-level signal, produced in a digital-to-analog conversion circuit, identifying the sum of the addend and augend signals.

The switch also transfers the carry-in signal to the conversion circuit to produce a four-level signal identifying the sum of the addend, augend and carry-in signals. Two further switches arranged in a summing circuit process the four-level signal to produce the sum signal from the stage.

BACKGROUND

This invention relates to an improved high speed parallel digital adder. In particular, it provides a multiple-stage binary adder in which each stage produces its carry-out signal considerably before producing its sum signal. The adder operates at high speed with less circuitry than is generally required in present-day adders of comparable operating speed.

The addition of two binary ONES produces a binary ZERO and a carry-out of a binary ONE, just as the addition of two decimal fives produces a ZERO and a carry-out of a decimal ONE. The realization of high speed in a parallel binary adder depends largely on the time required for a carry-out signal produced in any stage of the adder to propagate to one or more higher stages. In the extreme case, e.g. the addition of the decimal numbers 0001 and 0999, the carry-out signal from the lowest significance stage must propagate to the highest significance stage before the sum is available from the adder.

Each stage of a parallel digital adder conventionally employs circuits for producing the sum of the augend, addend and carry-in signals. Circuits are also provided for producing a carry-out signal, which is applied to the next higher significance stage as the carry-in signal.

Prior fast adders employ additional circuits to apply the carry-out signals from lower significance stages directly to stages several degrees higher in significance, thereby eliminating the time otherwise required for the carry signals to propagate to to the same higher significance stages through the intervening stages. However, these additional carry "skipping" circuits require considerable additional components and thereby add significantly to the manufacturing cost of the adder.

A principal object of this invention is to provide an improved electronic parallel digital adder. A further object is to provide a parallel digital adder characterized by relatively short operating time without the use of circuits for "skipping" carry-out signals to higher significance stages.

Another object of the invention is to provide a binary adder stage having a considerably shorter intrastage carry time than prior binary adder stages. The intrastage carry time is the time required to produce a carry-out signal from a stage after receipt of two or more assertive input signals.

More particularly, it is an object to provide a binary adder stage in which three operating times are substantially optimized in succession. The first time is that required to "propagate a carry." Assume the adder stage received an assertive augend or addend signal, and then receives an assertive carry-in signal from the next lower significance stage. The interval between receipt of the carry-in signal and production of an assertive carry-out signal is the time to propagate a carry. It is an object of this invention to optimize this time, i.e. to make it substantially as short as reasonably possible.

The second operating time of a binary adder stage is that required to "generate a carry-out" signal when both the augend signal and the addend signal are assertive, but the carry-in signal is not assertive. Thus, a further object of this invention is to provide a digital adder stage wherein the time to generate a carry is as brief as practical consistent with fast propagation of a carry.

The third operating time of an adder stage is the "sum time," the time to produce the sum digit. And it is a further object of this invention to provide an adder stage wherein the sum time is substantially as short as practical, consistent with the essentially minimized intrastage carry times discussed above.

Other objects of the invention will in part be obvious and will in part appear hereinafter.

The invention accordingly comprises the features of construction, combination of elements, and arrangement of parts exemplified in the construction hereinafter set forth, and the scope of the invention is indicated in the claims.

SUMMARY OF INVENTION

Each stage of the illustrated adder propagates a carry in approximately two nanoseconds and generates a carry in approximately five nanoseconds. These times are considerably shorter than in prior circuits. Further, the sum time of each adder stage is generally between thirty to forty nanoseconds. Thus, after an eighteen-bit adder embodying the invention receives an eighteen-bit augend and an eighteen-bit addend, and, if present, a "plus one" or increment signal, in the worst case the complete sum will be available within seventy-seven nanoseconds. Each stage will generate a carry, if at all, within five nanoseconds. And thirty-two more nanoseconds (16 stages times 2 nanoseconds each), or a total of thirty-seven nanoseconds, is the maximum time required for completion of the carry operation in the seventeen lower significance stages. Thereafter, assuming the highest significance stage receives an assertive carry-in signal, its sum digit will be available within at most forty nanoseconds, for a total of seventy-seven nanoseconds.

In brief, each stage of the adder has a carry circuit that produces the carry-out digit by combining a two-level signal identifying the carry-in digit with a three-level signal identifying the number of assertive augend and addend digits. An electronic switch transfers the carry-in signal directly to the output element that produces the carry-out signal. The output element also receives the three-level signal.

When the carry-in signal and either or both the augend and addend signals are ONE's, i.e. assertive, the output element produces a ONE carry-out signal. This operation of this portion of the adder stage determines its time to propagate a carry.

The carry circuit also produces a ONE carry-out signal when both the augend and the addend are ONE's, even when the carry-in signal is a ZERO, i.e. not assertive. The circuit is performing this carry-generating operation is isolated from the carry switch so as not to impair its rapid carry-propagating operation.

The three-level signal applied to the carry circuit is produced in a digital-to-analog conversion circuit, The conversion circuit also receives from the differential switch a signal identifying the value of the carry-in signal. In response to this carry-in identifying signal and the other signals, augend and addend, it receives, the conversion circuit also produces a four-level signal.

A sum circuit receives this four-level signal and produces a ONE sum signal when any one, or all, of the augend, addend and carry-in signals are ONE's. This is done with a pair of high speed differential switches. The conversion and sum circuits also are isolated from the carry switch of the carry circuit and hence do not retard its operation.

Further, each adder stage receives a carry-insert signal. This signal is used to execute the complement operation. An inclusive OR circuit combines it with the carry-in signal so that when either or both the carry-insert or carry-in signals are ONE's the sum circuit produces a ONE sum signal whenever none or both of the augend and addend signals also are ONE's.

The adder stages do not store any information. Accordingly, the present adder is generally used in conjunction with a first register that applies the augend word to it and with a second register that applies addend word. A third register receives the sum word and, where desired, the "overflow" signal, i e. the carry-out signal from the highest significance adder stage.

DESCRIPTION OF FIGURES

For a fuller understanding of the nature and objects of the invention, reference should be had to the following detailed description taken in connection with the accompanying drawings, in which.

DESCRIPTION OF PREFERRED EMBODIMENT

Logical representation

Figure 1:
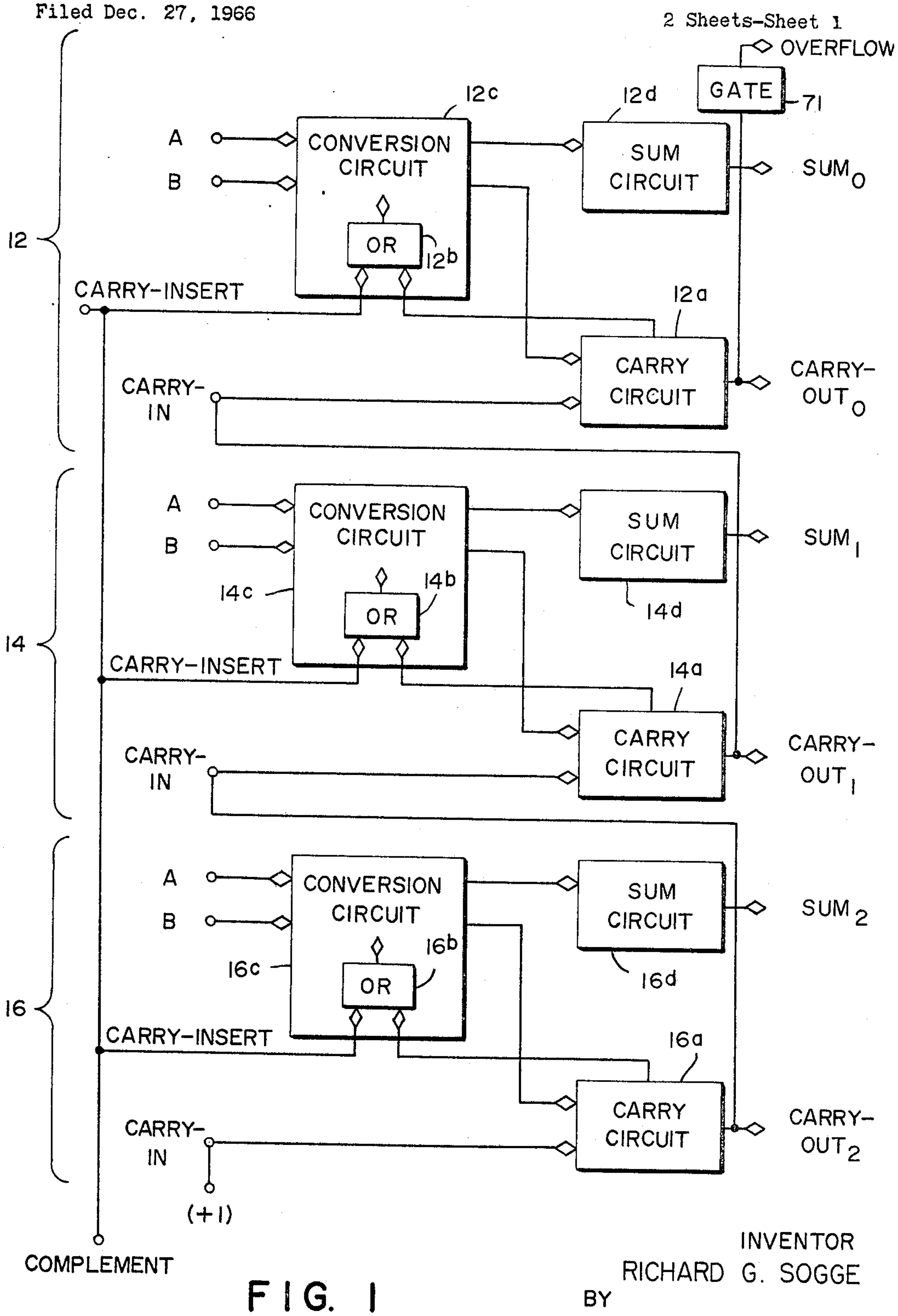
FIGURE 1 is a block schematic diagram of a three-stage parallel binary adder embodying the invention.

FIGURE 1 is a logical representation of a three-digit binary adder embodying the invention. The adder comprises three identical stages, 12, 14 and 16 associated respectively with the most significant binary digit, the intermediate significance bit and the least significance bit. Each stage receives an A signal identifying an augend bit, a B signal identifying an addend bit, a carry-in signal, and a carry-insert signal.

The carry-in signal for the most significant stage 12 is the carry-out signal from the next lower significant stage 14, and the carry-out signal from the lowest significant stage 16 is the carry-in signal for the intermediate significant stage 14. As indicated, the carry-in signal to the least significant stage is commonly a (+1) signal applied to the adder to increase by one binary count the number otherwise produced therein. Further, the carry-insert terminals are often connected to a single terminal that receives a signal whenever the adder is to be complemented.

In each stage, the carry-in signal is applied directly to a carry circuit **12*a*, 14*a*, 16*a*, that produces the carry-out signal. In addition, the carry circuit applies a signal identifying the value of the carry-in signal to an inclusive OR circuit 12*b*, 14*b*, 16*b* in a conversion circuit 12*c*, 14*c*, 16*c***. The OR circuit also receives the carry-insert signal. The A and B signals are applied directly to the conversion circuit.

The conversion circuit applies to the carry circuit a three-level signal identifying the number of A and B inputs receiving ONE's. The carry circuit in turn produces a ONE carry-out signal whenever two or more of the A, B and carry-in terminals receive ONE's.

Further, the conversion circuit in each stage applies a four-level signal to a sum circuit **12*d*, 14*d*, 16*d***. This four-level circuit identifies the number of ONE's the input circuit receives from the A and B inputs and from its OR circuit. The sum circuit produces a ONE sum signal when ONE's are received either at any one or at three of (a) the A input, (b) the B input, and (c) either or both the carry-in and carry-insert inputs.

Detailed description

Figure 2:
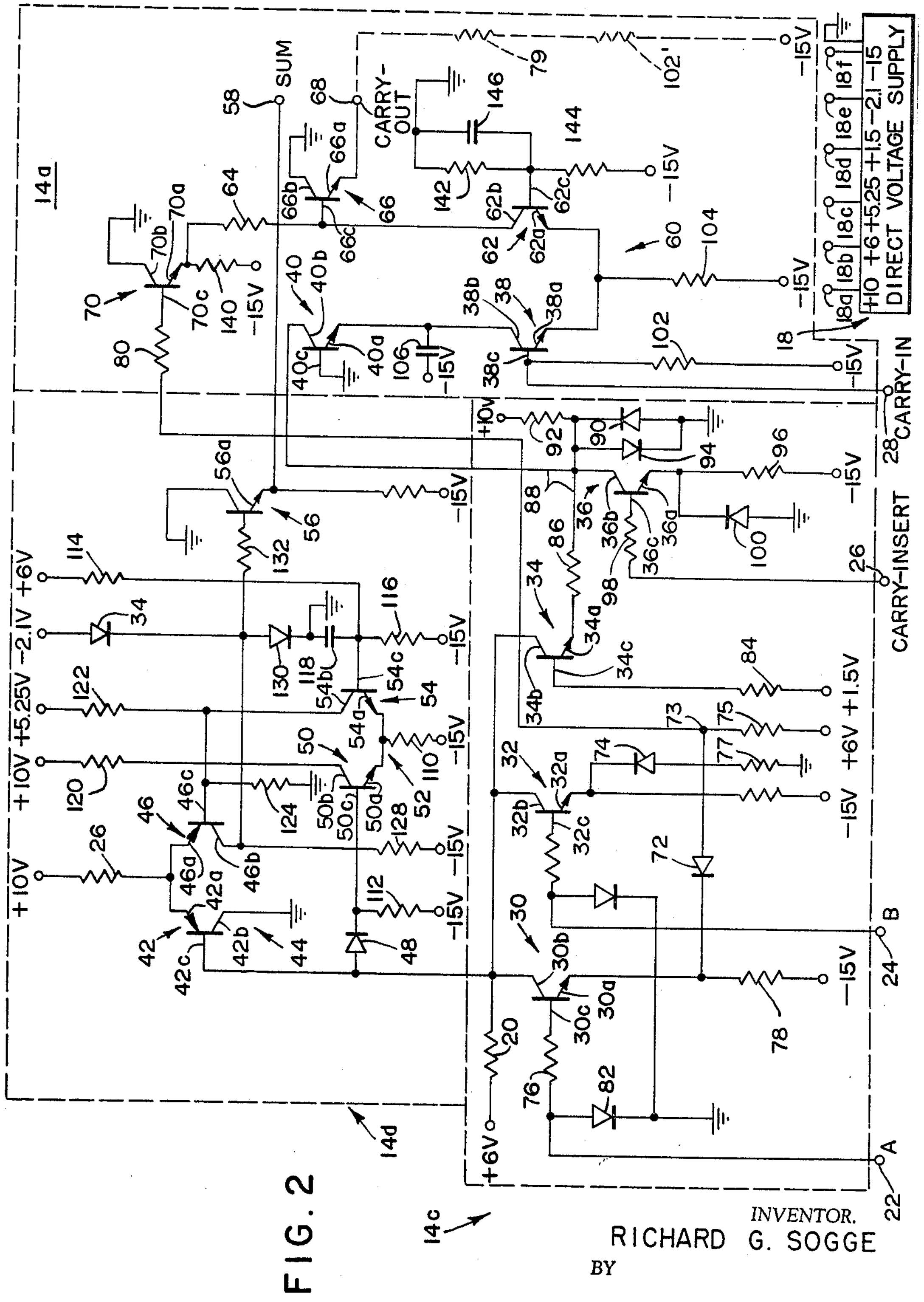
FIGURE 2 is a detailed schematic diagram of one stage of the FIGURE 1 adder.

FIGURE 2 shows the circuit of the FIGURE 1 adder stage 14; it is typical of all the adder stages. Although the assertion signals are referred to as ONE's and the negation signals as ZERO's, for this circuit the voltage levels for these logical signals are different for different inputs and outputs. For the A, B, and carry-insert signals, ONE is a ground level and ZERO is a small negative level, illustratively (−3) volts. A ONE sum signal has the negative level and a ZERO sum signal is the ground level. Further, although the carry-in and carry-out signals can have any one of four negative levels; the more negative two are logical ZERO's and the less negative two are logical ONE's.

A direct voltage supply 18 provides the operating voltages for the stage 14. The illustrated supply develops +10 volts at a terminal **18*a*, +6 volts at a terminal 18*b*, −5.25 volts at a terminal 18*c* and +1.5 volts at a terminal 18*d*. Voltages of −2.1 volts and −15 volts are developed at terminals 18*e* and 18*f***, respectively.

In the conversion circuit **14*c*, one end of a summing resistor 20 is connected to the +6 volt supply terminal. The A signal is applied to an input terminal 22, the B signal to an input terminal 24, the carry-insert signal to an input terminal 26 and the carry-in signal to an input terminal 28. When ZERO's are applied to these four terminals, transistors 30, 32 and 34** are off. Essentially zero current is then drawn through the summing resistor.

On the other hand, when a ONE is applied to the A terminal, the transistor 30 turns on and conducts one unit of current through the summing resistor 20. Likewise, when a binary ONE is applied to the B terminal, the transistor 32 draws one unit of current through the summing resistor. A ONE at the carry-insert terminal 26 turns on a transistor 36 which turns on the transistor 34. The latter transistor then draws one unit of current through the summing resistor.

Also, a ONE signal at the carry-in terminal 28 turns on a transistor 38 that turns on another transistor 40; both of these transistors are in the carry circuit **14*a*. When on, the transistor 40 turns on the transistor 34. Thus, the transistor 34 operates as an inclusive OR circuit 14*b* (FIGURE 1), drawing one unit of current through the summing resistor 20 so long as at least one of the terminals 26 and 28** receives a ONE.

In this way, the conversion circuit **14*c* develops in the summing resistor 20 an analog current having one of four successive magnitudes identifying the number of ONE's applied to the A terminal, the B terminal and any one of the carry terminals 26 and 28**.

In the sum circuit **14*d*, the four-level voltage drop across the summing resistor is coupled across the emitter-base junction of a transistor 42 arranged in a differential amplifier 44 with a transistor 46. The voltage across the summing resistor is also coupled, through a diode 48 that inserts a current-independent voltage drop, across the emitter-base junction of a transistor 50 that forms a second differential amplifier 52 with a transistor 54**.

The two differential amplifiers are interconnected to form a logical circuit that develops a binary, i.e. two-level, voltage at the collector of transistor 46 according to the value of the voltage drop across the summing resistor. A transistor 56, arranged as an emitter follower, applies this binary voltage to the sum terminal 58.

When the summing resistor 20 carries either zero units or one unit of current, in the differential amplifier 52, the voltage at the transistor base **50*c* is positive with respect to the voltage at the base 54*c*. Hence the transistor 50 is on, and the transistor 54** is off.

In the differential amplifier 44, the no-current drop across the resistor 20 maintains the base **42*c*** positive relative to the base *46c*, which is at the same potential as the collector *54b*. Therefore, the transistor 42 is off and transistor 46 is on. The resultant voltage at the collector *46b* causes the emitter-follower transistor 56 to produce a ZERO at the sum terminal 58.

However, when one input terminal 22–28 receives a ONE, so that the resistor 20 carries one unit of current, the voltage at the base *42c* drops below the voltage at the base *46c* and the conduction state of the differential amplifier 44 switches, with transistor 42 turning on and transistor 46 turning off. The voltage at the collector *46b* therefore drops, causing the transistor 56 to produce a ONE sum signal.

When the summing resistor carries either two or three units of current, the base *54c* is positive with respect to the base *50c* and hence the transistor 50 is off and transistor 54 is on. The conduction path through transistor 54 lowers the voltage at the base *46c* from the value it had when transistor 54 was off.

With this new reference voltage at the base *46c*, transistor 46 is on when two units of current are drawn through the suming resistor. Transistor 56 then produces a ZERO sum signal. But transistor 46 is off, so that a ONE sum signal is produced, when the resistor carries three units of current.

Thus, each differential amplifier 44 and 52 consists of two electronic switches and functions as a differential switch having an input terminal (i.e. the transistor bases *42c* and *50c*), a reference terminal (i.e. the bases *46c* and *54c*), and an output terminal (i.e. the collectors *46b* and 54b). Further, each differential switch assumes one of two conduction states depending on the relative magnitude of the voltages at its input and reference terminals. Further, the output terminal of one differential switch (i.e. the terminal *54b*), is connected to the reference terminal of the other switch.

The differential amplifier 52 receives a reference voltage, at the base *54c* intermediate the two input voltages the amplifier receives at its terminal *50c* when the summing resistor carries, respectively, one unit of current and two units of current. Depending on its conduction state, the amplifier 52 applies one of two reference voltages to the reference terminal *46c* of the other differential amplifier. Thus, when the transistor 54 is off, the magnitude of the amplifier 44 reference voltage is intermediate the voltages applied to the input terminal *42c* when, respectively, the resistor 20 carries zero units and one unit of current. Alternatively, when the transistor 54 is on, it constrains the amplifier 44 reference voltage to a value intermediate the two voltages applied to the input terminal *42c* when the resistor carries two units of current and when it carries three units of current.

Referring again to the conversion circuit *14c*, when both transistors 30 and 32 are off, diodes 72 and 74 are forward biased. The diodes then provide parallel conduction paths to ground from a terminal 73 at the interconnection of resistors 75 and 77 that form a voltage divider between the +6 volt supply terminal and ground. A relatively large negative voltage results at the terminal 73.

When one, but not both, of the transistors 30, 32 is on, due to a ONE at one of the terminals 22 and 24, the diode 72, 74 connected with it is back biased. Conduction through the other diode maintains the terminal 73 at a lesser negative voltage. Finally, when both transistors 30 and 32 are on, both diodes are back biased and a slight positive voltage develops at the terminal 73.

In this manner, the conversion circuit *14c* produces at the terminal 73 an analog signal having one of three successive magnitudes according to the number of ONE's at the A and B terminals 22 and 24.

In the carry circuit *14a*, a resistor 80 applies this three-level analog signal to the base of a transistor 70 operating as an emitter follower. A resistor 64 applies the corresponding voltage developed at the emitter *70a* to the base of an output transistor 66 which is also arranged as as emitter follower. The emitter *66a* is connected directly to the carry-out terminal 68 of the stage 14. The collector of the transistor 70 is grounded and a resistor 140 is connected from its emitter *70a* to the −15 volt supply terminal.

The transistor 70 is normally always conducting, as is the transistor 66. Hence the voltage at the base *66c*, and correspondingly at the carry-out terminal 68, reflects the voltage at the terminal 73. However, the carry-in signal at terminal 28 also affects the voltage at the carry terminal 58 by selectively causing the resistor 64 to transfer the voltage at the emitter *70a* to the base *66c* with or without an offset, depending on the value of the carry-in signal.

In particular, a ONE carry-in signal turns on the transistor 38. A transistor 62, arranged in a differential amplifier 60 with the transistors 38, is thereby constrained off. The transistor 62 accordingly draws essentially zero current through the resistor 64, which together with transistor 70 is in series in the conduction path of transistor 62. Conversely, a ZERO carry-in signal at terminal 28 turns off transistor 38, which turns on transistor 62. The transistor 62 then draws a known current through the resistor 64, producing a known voltage drop across it. In this manner, the differential amplifier 60 operates as a high speed differential switch that rapidly applies the carry-in signal to the output transistor 66. There the signal is combined with the three-level analog signal identifying the A and B signals to produce the carry-out signal.

For example, when ZERO's are applied to the input terminals 22, 24 and 28, the transistor 70 develops the most negative of three possible voltages at its emitter *70a* and the transistor 62 is on, drawing a known current through the resistor 64. This causes the voltage at the base of transistor 66, and correspondingly at the emitter thereof and hence at the carry terminal 68, to have the most negative of four possible values. This large, say four-unit, negative level at the carry-out terminal 68 is a logical ZERO and indicates that there is no carry from the adder stage 14.

Further, when a ONE is applied to only one of the A and B terminals, or when the carry-in signal alone is a ONE, the voltage applied to the base of the transistor 66 and hence the voltage at the carry terminal 68 is three units negative. This carry-out voltage also is identified as a logical ZERO.

When ONE's are applied to any two (but not three) of the terminals 22, 24 and 28, the voltage at the base of transistor 66 increases to a still smaller negative value, constraining the voltage at the carry-out terminal 68 to be two units negative, this level is identified as a logical ONE carry-out signal. Finally, when all three of the A, B and carry-in signals are ONE's, the voltage at the carry-out terminal 68 is only one unit negative, its least negative value, again identifying a logical ONE.

The transistor 70 thus couples the three-level signal the conversion circuit *14c* develops at terminal 73 to the differential amplifier 60. Further, the transistor 70 presents a low impedance to the current the transistor 62 draws through it and the voltage at its emitter is essentially exclusively dependent on the voltage at its base, being substantially independent of the transistor 62 current. Also, the switching operation of the differential amplifier 60 and the magnitude of the current it draws through resistor 64 are not affected by the voltage the conversion circuit develops at the base *70c*.

The carry circuit *14a* thus applies the three-level signal produced at the conversion circuit terminal 73 to the carryout terminal 68 through two successive emitter-follower transistors 70 and 66. The first such transistor forms part of the collector current path for the transistor 62, whose conduction state is controlled with the carry-in signal. Hence the voltage drop across the resistor 64, which couples the two emitter followers 70 and 66 together, is responsive to the carry-in signal. As a result, the second emitter follower 66 produces the carry-out signal with one of four successive magnitudes, according to the number of assertive augend, addend and carry-in signals the adder stage receives.

This carry-out signal can be applied to a two-state quantizing circuit, such as the gate 71 connected to the FIGURE 1 carry-out terminal from stage 12, to produce standard binary levels for whatever equipment the added stage drives. However, when the carry-out signal from the stage 14 is applied to the carry-in terminal of a like higher significance stage, as shown in FIGURE 1, the differential amplifier 60 (FIGURE 2) of the latter stage provides the binary quantizing operation. That is, the reference voltage the voltage divider resistors 142 and 144 develop at the base terminal 62*c* of the differential amplifier 60 is intermediate the voltages developed at the base 38*c* by the two-unit negative and three-unit negative carry-out signals.

The transistor 40 in the carry circuit serves to couple a signal responsive to the carry-in signal from the differential amplifier 60 to the conversion circuit 14*c*. However, the switching operation of the amplifier 60 is essentially independent of the conduction state of transistor 40, as well as of the operation of the transistors 34 and 36 connected to the other side of transistor 40.

As shown at the right side of FIGURE 2, the carry signal from stage 14 is preferably applied to the stage 12 carry-in terminal through a resistor 79. Hence this resistor and the resistor 102 in the carry circuit of stage 12 complete the emitter current path for the stage 14 output transistor 66.

Further details of FIGURE 2

With further reference to FIGURE 2, in the conversion circuit 14*b*, a resistor 76 applies the A signal from the input terminal 22 to the transistor base 30*c*. A diode 82 connected to ground from the A terminal limits the positive excursion of the base input voltage and hence limits the current the transistor 30 draws through the summing resistor 20. The transistor collector 30*b* is connected directly to one end of the summing resistor 20, and a resistor 78 is connected between the transistor emitter 30*a* and the −15 volt supply terminal.

The transistor 32 that receives the B signal from the input terminal 24 is arranged in a circuit identical to the one just described connected with the transistor 30.

The collector of the transistor 34 is connected to the summing resistor 20 in parallel with the connections from the collectors of the transistors 30 and 32. A resistor 84 is connected between the base 34*c* and the +1.5 volt supply terminal. A resistor 86 is connected between the emitter 34*a* and a common conductor 88.

A diode 90 limits the negative voltage of the conductor 88 to the small forward voltage drop through the diode, illustratively 0.7 volt. Further, a diode 94 prevents the conductor 88 from becoming more positive than the diode forward voltage drop, which illustratively is 1.5 volts.

The transistor 34 conducts current through the summing resistor 20 only when at least one of the two parallel paths from its emitter 34*a* to the −15 volt supply terminal is conductive; the transistor 36 forms one path and the series-connected transistors 38 and 40 form the other. The path through the transistor 36 is provided by connecting the collector 36*b* to the common conductor 88 and connecting a resistor 96 between the emitter 36*a* and the −15 volt supply terminal. A resistor 98 applies the carry-insert signal from the terminal 26 to the transistor base 36*c*. In addition, a diode 100 is connected between the emitter 36*a* and ground.

In the other path for summing resistor current drawn by the transistor 34, the carry-in signal from the terminal 28 is applied directly to the transistor base 38*c*; a resistor 102 is connected from this terminal to the −15 volt supply terminal. An emitter resistor 104, common to both transistors 38 and 62, is connected to the −15 volt supply terminal. The collector 38*b* is connected directly to the emitter of the transistor 40; a coupling capacitor 106 is connected between this interconnection and the −15 volt supply terminal. The base 40*c* is connected directly to ground and the collector of the transistor 40 is connected directly to the common conductor 88.

When both the carry-insert signal and the carry-in signal are ZERO's, the transistor 36 and the transistors 38 and 40 are off. The resistor 92 and diode 94 then clamp the common conductor 88 to a small positive voltage sufficient to maintain the transistor 34 off. This ensures that the transistor 34 draws essentially no current through the summing resistor 20.

On the other hand, conduction through the transistor 36 drops the voltage at collectors 36*b*, and correspondingly at the common conductor 88, to the small negative level determined by the diode 90. This voltage causes transistor 34 to draw a known, one-unit, current through the summing resistor 20 and the transistor 36.

When the assertive carry-insert signal terminates, the transistor base 36*c* goes negative within negative-going carry-insert signal. The diode 100 prevents the emitter 36*a* from going more negative than the diode forward voltage drop (illustratively 3 volts), and therefore the transistor 36 quickly turns off, terminating the current in the summing resistor.

When the carry-in signal is assertive, it turns on the transistor 38 which turns on the transistor 40. Conduction through these two transistors again lowers the potential on the common conductor 88 sufficiently to turn on the transistor 34 and cause it to draw one-unit of current through the summing resistor 20.

When both the carry-insert and the carry-in signals are assertive, transistor 34 draws the same current as when only one of these signals is assertive.

Turning to the sum network 14*d*, the differential amplifier 52 has a common emitter resistor 110 connected to the −15 volt supply terminal. A resistor 112 is connected between the base 50*c* and the −15 volt supply terminal, and the base of the transistor 54 is connected to the interconnection of resistors 114 and 116 forming a voltage divider between the +6 volt and −15 volt supply terminals. Further, a coupling capacitor 118 is connected from the base 54*c* to ground.

Also, in the differential amplifier 52, a resistor 120 is connected from the collector 50*b* to the +10 volt supply terminal and a resistor 122 is connected between the collector 54*b* and the +5.25 volt supply terminal. A resistor 124 is connected from the base 54*c* to ground.

The differential amplifier 44 also has a common emitter resistor 126 connected to the +10 volt supply terminal. The collector 42*b* is connected to ground and a resistor 128 is connected between the collector 46*b* and the −15 volt supply terminal.

As described above, when the summing resistor 20 carries no current (zero units) or two units of current, transistor 46 is on. The voltage at the collector 46*b* accordingly tends to go positive, the resistor 128 being many times larger than resistor 126. However, a diode 130, connected between the collector 46*b* and ground, limits the positive excursion of the collector voltage to the diode forward voltage drop, which is illustratively 1.5 volts.

Thus, when the transistor 46 is on, it applies a known voltage to the base of the emitter-follower transistor 56 through a resistor 132. In response, the transistor 56 turns on and develops a near-ground voltage at the sum terminal 58. As noted above, this is the logical ZERO sum signal.

On the other hand, when the summing resistor 20 carries either one unit or three units of current, the transistor 46 is off. The voltage at the collector 46*b* is at a negative value. A diode 134, connected between the collector 46*b* and the −2.1 volt supply terminal, clamps this negative voltage to a known value. This voltage biases the transistor 56 off. Hence, a known negative voltage, the logical ONE signal, develops at the emitter 56*a* and correspondingly at the sum terminal 58.

The transistors in the differential amplifiers 44, 52 and 60 of the illustrated circuit are preferably operated to be cut-off when off and to be conducting a known current and not saturated when on. However, the logical operation of the circuit only requires that each of these switches 44, 52 and 60 develop two known, measurably-different levels depending on its conduction state.

It will thus be seen that the objects set forth above, among those made apparent from the preceding description, are efficiently attained and, since certain changes may be made in the above construction without departing from the scope of the invention, it is intended that all matter contained in the above description or shown in the accompanying drawing shall be interpreted as illustrative and not in a limiting sense.

Having described the invention, what is claimed as new and secured by Letters Patent is:

1. A digital adder comprising:

(A) augend, addend and carry-in input terminals (22, 24, 28), (B) a carry-out terminal (68) and a sum terminal (58), (C) summing means (14*c*, 14*d*)

(1) arranged to apply a first signal to said sum terminal when an even number, including zero, of said input terminals receive assertion signals, and (2) arranged to apply a second signal to said sum terminal when an odd number of said input terminals receive assertion signals, (D) input means (14*c*) connected with said addend and augend input terminals and producing a multiple-level signal identifying the number of said addend and augend input terminals receiving assertion signals, (E) carry output means (66) having an input terminal (66*c*) and applying to said carry-out terminal a signal corresponding in magnitude to the signal applied to its input terminal, and (F) switching means (60)

(1) connected to receive a signal identifying the signal applied to said carry-in terminal and in circuit with said input terminal of said carry output means, (2) arranged to assume a first conduction state when the signal received from said carry-in terminal exceeds a selected value in a first direction and, alternatively, to assume a second conduction state when the signal received from said carry-in terminal exceeds said selected value in the opposite second direction, and (3) applying a signal identifying the value of said multiple-level signal to said input terminal of said carry output means (a) with a first offset when in said first conduction state, and (b) with a second offset when in said second conduction state.

2. A binary adder according to claim 1 in which:

(A) said input means (14*c*) produces said multiple-level signal as a potential at a fifth terminal (73), (B) said switching means (60) comprises first and second electronic switches (38, 62) arranged in a differential amplifier, (1) one of said electronic switches conducting a first current when said switching means is in said first conduction state and conducting a second current when said switching means is in said second conduction state, and (C) a circuit element (64)

(1) has two terminals thereon connected between said fifth terminal and the input terminal of said carry output means and in the conduction path of said one electronic switch, and (2) develops across said two terminals measurably different voltages when said one electronic switch respectively conducts said first current and when it conducts said second current.

3. A binary adder according to claim 1 in which said switching means is a differential switch (A) having an input terminal (38*c*) receiving a signal identifying the signal applied to said carry-in terminal, and (B) having a reference terminal (62*c*) receiving said selected value signal with a magnitude intermediate the signals developed at its input terminal when said carry-in terminal receives an assertion signal and when it receives a negation signal, (C) so that said conduction state of said switching means identifies whether a negation or assertion signal is applied to said carry-in terminal.

4. A digital adder according to claim 1 in which (A) said switching means is connected substantially directly to said carry-in terminal, and (B) isolating means (40)

(1) is connected between said switching means and said summing means, (2) applies to said summing means a signal identifying the signal applied to said carry-in terminal, and (3) substantially isolates the operation of said summing means from said switching means.

5. A digital adder according to claim 1 in which (A) isolating means (70)

(1) is connected between said input means and said switching means, (2) applies said multiple-level signal to said switching means and said carry output means, and (3) substantially isolates the operation of said input means from said switching means.

6. A digital carry circuit comprising (A) augend, addend and carry-in input terminals (22, 24, 28), (B) a carry-out terminal (68), (C) first (14*c*, 70) producing a three-level signal identifying the number of said augend and addend terminals receiving an assertion signal, and (D) switch means (60)

(1) connected with said carry-in terminal, with said first means to receive said three-level signal and in circuit with said carry-out terminal, (2) producing a two-level signal identifying whether said carry-in terminal receives an assertion signal or a negation signal, and (3) arranged to apply such an additive function of said three-level signal and said two-level signal to said carry-out terminal that an assertion carry-out signal is developed only when any two or more of said input terminals receive assertion signals.

7. A digital carry circuit according to claim 6 in which (A) a resistive element (64) having a pair of terminals (1) receives at one terminal thereof a voltage having one of three magnitudes according to the value of said three-level signal, and (2) is in circuit at the other terminal thereof with said carry-out terminal, and (B) said switching means is arranged to draw one of two different currents through said resistive element in response to the presence or absence of an assertion signal at said carry-in terminal, (C) so that a four-level signal develops at said other terminals of said resistive element, said four-level signal identifying the number of said input terminals receiving assertion signals.

8. A digital carry circuit according to claim 6 in which (A) said switch means comprises first and second controllable electronic switches arranged in a differential amplifier,
(1) said first switch (38)
(a) receiving a signal identifying the signal applied to said carry-in terminal,
(b) being rendered conductive when an assertion signal is applied to said carry-in terminal, and
(c) being rendered nonconductive when a negation signal is applied to said carry-in terminal,
(2) said second switch being rendered conductive to provide a conduction path therethrough only when said first electronic switch is nonconductive, and
(B) a resistance element having a pair of terminals
(1) is arranged to receive at one terminal thereof a voltage having one of three magnitudes according to the value of said three-level signal,
(2) is connected at the other terminal thereof with said second switch to be in series in the conduction path of said second switch,
(C) whereby the voltage at a point between said resistive element and said second switch has any one of four values depending on the value of said three-level signal and on the conduction state of said second switch.

9. A binary adder comprising
(A) augend, addend and carry-in input terminals (22, 24, 28),
(B) a carry-out terminal (68) and a sum terminal (58),
(C) digital-to-analog conversion means (**14*c***) connected with said augend and addend input terminals and producing a three-level signal in response to and identifying the number of said augend and addend terminals receiving assertion signals,
(D) a first transistor (70)
(1) receiving at the base a signal identifying the magnitude of said three-level signal, and
(2) developing at the emitter a voltage corresponding to the magnitude of said three-level signal,
(E) a second transistor (66) arranged as an emitter follower and having its emitter connected with said carry-out terminal,
(F) a resistor (64) connected between the emitter of said first transistor and the base of said second transistor,
(G) third and fourth transistors (38, 62)
(1) arranged in a differential amplifier (60) with their emitters connected together,
(2) the base of said third transistor being connected with said carry-in terminal,
(3) the base of said fourth transistor being arranged to receive a voltage intermediate the voltages applied to the base of said third transistor when said carry-in terminal receives an assertion signal and when it receives a negation signal, and
(4) the collector of said fourth transistor being connected with the base of said second transistor.

10. A binary adder according to claim 9 further comprising summing means (**14*c*, 14*d***)
(A) connected with said sum terminal,
(B) arranged to respond to the signals applied to said augend terminal, said addend terminal and the collector of said third transistor to apply to said sum terminal
(1) a first signal when an even number, including zero, of said input terminals receive assertion signals, and
(2) a second signal when an odd number of said input terminals receive assertion signals.

11. A binary adder according to claim 9 in which
(A) said conversion means
(1) is part of said summing means,
(2) is further connected to the collector of said third transistor to receive a signal identifying the signal applied to said carry-in terminal, and
(3) produces a four-level signal identifying the number of said input terminals receiving assertion signals, and
(B) said summing means has a logic circuit (44, 52) producing said first and second signals in response to said four-level signal.

12. A binary adder comprising
(A) augend, addend and carry-in input terminals (22, 24, 28),
(B) a carry-out terminal (68) and a sum terminal (58),
(C) input means (**14*c***)
(1) connected with said augend and addend input terminals, and arranged to receive a signal identifying the signal applied to said carry-in terminal,
(2) producing a four-level signal in response to and identifying the number of said input terminals receiving assertion signals,
(D) first differential switching means (44)
(1) having a reference terminal (**46*c***) arranged to receive a reference signal,
(2) having an input terminal (**42*c***) connected with said input means to receive a signal identifying the magnitude of said four-level signal,
(3) in circuit with said sum terminal, and
(4) producing at said sum terminal one of first and second signals according to the magnitude of the signal at its reference terminal relative to the signal at its input terminal,
(E) second switching means (52)
(1) connected with said input means to receive a signal responsive to said four-level signal,
(2) in circuit with said reference treminal of said first switching means,
(3) responding to a signal identifying any one of first and second values of said four-level signal to produce a first reference signal at said reference terminal, and
(4) responding to a signal identifying any one of third and fourth values of said four-level signal to produce a second reference signal at said reference terminal.

13. A binary adder according to claim 12 further comprising carry means (**14*a***) arranged to produce a signal identifying whether two or more of said input terminals receive assertion signals.

14. An adder according to claim 13 in which
(A) said carry-in terminal is connected substantially directly to said carry means, and
(B) said input means is connected with said carry means to receive said signal identifying the signal applied to said carry-in terminal.

15. A binary adder according to claim 12 in which
(A) said second switching means
(1) produces said first reference signal with a magnitude intermediate the values of said signals said input terminal of said first switching means receives
(a) identifying said first value of said four-level signal and
(b) identifying said second value of said four-level signal, and
(2) produces said second reference signal with a magnitude intermediate the values of said signals said input terminal of said first switching means receives
(a) identifying said third value of said four-level signal and
(b) identifying said fourth value of said four-level signal.

16. A binary summing network comprising
(A) a sum terminal (58),
(B) augend, addend and carry-in terminals (22, 24, and 26 or 28),
(C) input means (14*d*) connected with said input terminals and producing a multiple-level signal in response to and identifying the number of said input terminals receiving assertion signals,
(D) first and second differential switching means (44, 52)
(1) each having at least an input terminal (42*c*, 50*c*), a reference terminal (46*c*, 54*c*) and an output terminal (46*b*, 54*b*),
(2) each operable in any one of two conduction states according to the value of the signal applied to said input terminal thereon relative to signal applied to said reference terminal thereon,
(3) each receiving at said input terminal thereon a signal identifying the magnitude of said multiple level signal,
(4) said output terminal of said first differential switching means being in circuit with said sum terminal, and
(5) said second differential switch (a) having said output terminal thereon connected with said reference terminal of said first differential switch, and
(b) changing the signal applied to said reference terminal of said first differential switch according to its conduction state.

17. A summing network according to claim 16 in which each of said differential switching means is a differential amplifier.

References Cited

UNITED STATES PATENTS

| | | | |
|---|---|---|---|
| 3,113,206 | 12/1963 | Harel | 235—176 |
| 3,192,369 | 6/1965 | Schmitt | 235—175 |
| 3,316,393 | 4/1967 | Ruthazer | 235—175 |
| 3,420,992 | 1/1969 | Nissim et al. | 235—176 |

MALCOLM A. MORRISON, Primary Examiner

C. E. ATKINSON, Assistant Examiner

U.S. Cl. X.R.

235—168, 173, 176